(12) United States Patent
Fahimi et al.

(10) Patent No.: US 10,203,256 B2
(45) Date of Patent: *Feb. 12, 2019

(54) DUPLEX PRESSURE TRANSDUCERS

(71) Applicant: Rosemount Aerospace Inc., Burnsville, MN (US)

(72) Inventors: Saeed Fahimi, Bloomington, MN (US); Odd H. Eriksen, Minneapolis, MN (US); Charles Little, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/232,128

(22) Filed: Aug. 9, 2016

(65) Prior Publication Data

US 2016/0349133 A1 Dec. 1, 2016

Related U.S. Application Data

(63) Continuation of application No. 14/189,899, filed on Feb. 25, 2014, now Pat. No. 9,423,315.

(60) Provisional application No. 61/890,935, filed on Oct. 15, 2013.

(51) Int. Cl.
| | | |
|---|---|---|
| *G01L 13/02* | (2006.01) | |
| *G01D 11/24* | (2006.01) | |
| *G01L 13/04* | (2006.01) | |
| *G01L 19/00* | (2006.01) | |
| *G01L 15/00* | (2006.01) | |

(52) U.S. Cl.
CPC .......... *G01L 13/028* (2013.01); *G01D 11/245* (2013.01); *G01L 13/04* (2013.01); *G01L 19/0038* (2013.01); *G01L 15/00* (2013.01)

(58) Field of Classification Search
CPC ...... G01L 15/00; G01L 19/14; G01L 19/0038
See application file for complete search history.

(56) References Cited

U.S. PATENT DOCUMENTS

| | | |
|---|---|---|
| 3,085,437 A | 4/1963 | Osterstrom |
| 3,999,435 A | 12/1976 | Siegel |
| 4,121,334 A * | 10/1978 | Wallis .................. G01L 9/0042 257/E21.505 |

(Continued)

FOREIGN PATENT DOCUMENTS

CH 566547 A5 9/1975

OTHER PUBLICATIONS

Extended European Search Report dated Feb. 18, 2015 issued on corresponding European Patent Application No. EP 14189021.0.

(Continued)

*Primary Examiner* — Harshad R Patel
*Assistant Examiner* — Tran M Tran
(74) *Attorney, Agent, or Firm* — Locke Lord LLP; Scott D. Wofsy; Alicia J. Carroll

(57) ABSTRACT

A transducer baseplate includes a base, a protrusion extending from the base along a longitudinal axis, a pair of opposed transducer receptacles defined within the protrusion, and respective pressure plena. The pressure plena are separated by a plenum wall, each plenum being in fluid connection with an area external to the protrusion through a respective pressure line. The pressure lines provide a direct fluid path to their respective receptacles.

18 Claims, 2 Drawing Sheets

(56) References Cited

U.S. PATENT DOCUMENTS

| | | | | |
|---|---|---|---|---|
| 4,131,088 A | * | 12/1978 | Reddy | G01L 9/06 123/494 |
| 4,222,277 A | | 9/1980 | Kurtz et al. | |
| 4,340,409 A | | 7/1982 | Brooks et al. | |
| 4,586,108 A | | 4/1986 | Frick | |
| 4,766,769 A | | 8/1988 | Nudd, Jr. et al. | |
| 4,975,390 A | * | 12/1990 | Fujii | G01L 9/0042 148/DIG. 12 |
| 5,094,109 A | | 3/1992 | Dean et al. | |
| 5,287,746 A | | 2/1994 | Broden | |
| 5,319,981 A | | 6/1994 | Mei et al. | |
| 5,524,492 A | | 6/1996 | Frick et al. | |
| 5,621,175 A | | 4/1997 | Nagasu et al. | |
| 5,731,522 A | | 3/1998 | Sittler | |
| 5,935,189 A | * | 8/1999 | Park | G01M 15/11 701/111 |
| 5,988,203 A | * | 11/1999 | Hutton | G01F 1/36 137/271 |
| 6,023,978 A | * | 2/2000 | Dauenhauer | G01L 9/045 338/42 |
| 6,484,585 B1 | | 11/2002 | Sittler et al. | |
| 6,520,020 B1 | | 2/2003 | Lutz et al. | |
| 6,564,642 B1 | * | 5/2003 | Clifford | G01L 9/0073 73/716 |
| 6,581,468 B2 | * | 6/2003 | Clifford | G01L 19/0038 73/715 |
| 6,583,631 B2 | * | 6/2003 | Park | G01R 27/2617 324/663 |
| 6,584,853 B2 | * | 7/2003 | Park | G01L 19/147 73/754 |
| 7,308,830 B2 | | 12/2007 | Harasyn et al. | |
| 7,379,792 B2 | | 5/2008 | Hedtke | |
| 7,401,522 B2 | | 7/2008 | Broden et al. | |
| 7,454,975 B2 | | 11/2008 | Louwagie et al. | |
| 7,516,667 B2 | * | 4/2009 | Ueno | G01L 19/0038 361/283.1 |
| 7,526,962 B1 | * | 5/2009 | Kurtz | G01L 15/00 73/716 |
| 7,607,354 B2 | | 10/2009 | Jacobsen | |
| 7,775,126 B2 | * | 8/2010 | Eckhardt | A61M 5/14 604/131 |
| 7,779,699 B2 | * | 8/2010 | Kurtz | G01L 15/00 73/716 |
| 7,980,137 B2 | | 7/2011 | Ohtani et al. | |
| 8,304,847 B2 | * | 11/2012 | Kaminaga | G01L 15/00 257/417 |
| 8,429,978 B2 | | 4/2013 | Klosinski et al. | |
| 8,695,417 B2 | * | 4/2014 | Speldrich | G01F 1/6842 73/204.22 |
| 9,010,191 B2 | | 4/2015 | Strei et al. | |
| 9,054,222 B2 | * | 6/2015 | Tham | G01L 9/0073 |
| 9,116,056 B2 | * | 8/2015 | Gardner | G01L 15/00 |
| 9,234,776 B2 | * | 1/2016 | Strei | G01F 1/383 |
| 9,683,876 B2 | * | 6/2017 | Parrotto | G01F 1/42 |
| 2016/0231193 A1 | * | 8/2016 | Haldorsen | G01L 13/02 |

OTHER PUBLICATIONS

European Examination Report dated Mar. 12, 2018, issued during the prosecution of European Patent Application No. 14189021.0 (4 pages).

\* cited by examiner

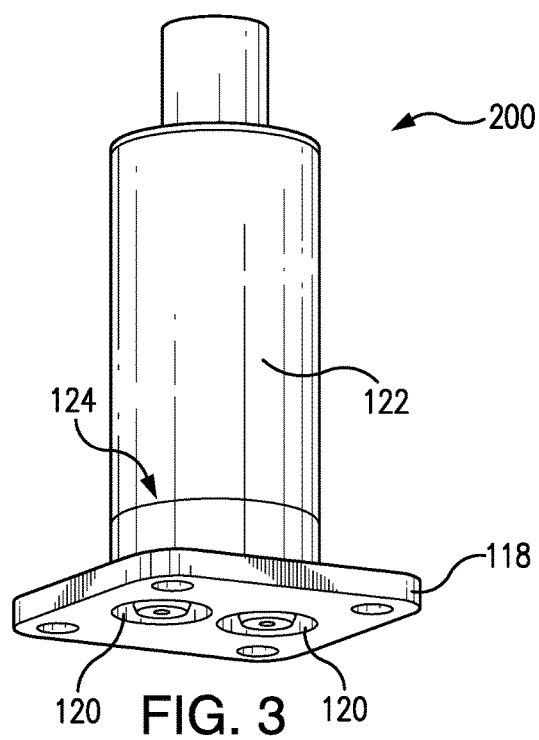
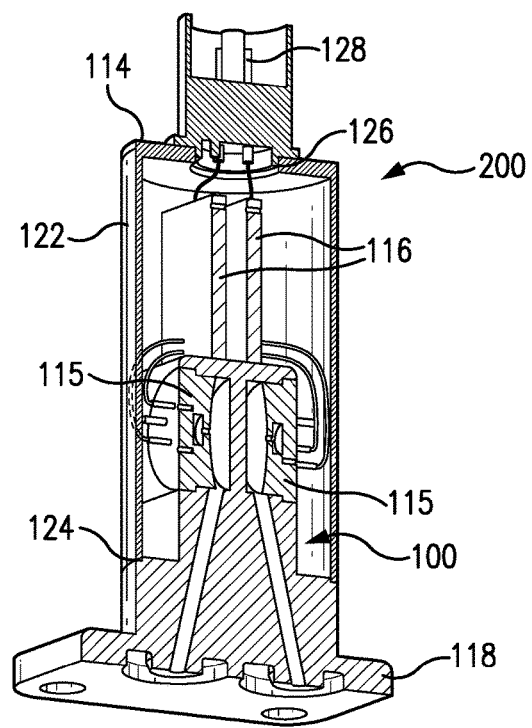
FIG. 3
FIG. 4

DUPLEX PRESSURE TRANSDUCERS

CROSS-REFERENCE TO RELATED APPLICATIONS

This application is a continuation of U.S. application Ser. No. 14/189,899, filed on Feb. 25, 2014, which claims priority to U.S. Provisional Patent Application No. 61/890,935 filed Oct. 15, 2013, both of which are incorporated by reference herein in their entirety.

BACKGROUND OF THE INVENTION

1. Field of the Invention

The present disclosure relates to differential pressure transducers, and more particularly to high temperature duplex pressure transducers.

2. Description of Related Art

Differential pressure measurements can be accomplished by a differential pressure transducer which provides an output that is the difference between two pressures. In the case of the absolute pressure transducer, the output is truly indicative of monitored pressure, e.g. relative to a vacuum. A duplex differential pressure transducer traditionally has two separate absolute pressure capsules to measure differential pressure across a medium such as, for example, an oil filter. The monitored absolute pressure output from each pressure capsule is compared to determine the pressure difference between an inlet side and an outlet side of the oil filter.

Generally, traditional duplex pressure transducers must meet certain accuracy and size requirements. Larger pressure capsules increase pressure measurement accuracy. But, on the other hand, duplex pressure transducers are generally found in confined areas where space and clearance are critical, making dimension requirements and size high priority considerations. Duplex pressure transducers generally house the pressure capsules in a side-by-side horizontal arrangement.

Such conventional methods and systems have generally been considered satisfactory for their intended purpose. However, there is still a need in the art for duplex pressure transducers that allow for improved accuracy while still conforming to envelope size restrictions. There also remains a need in the art for such duplex pressure transducers that are easy to make and use. The present disclosure provides a solution for these problems.

SUMMARY OF THE INVENTION

A transducer baseplate includes a base with a protrusion extending from the base along a longitudinal axis, a pair of opposed transducer receptacles defined within the protrusion, and a pair of respective pressure plena. The pressure plena are separated by a plenum wall, one plenum in fluid communication with each receptacle, respectively, and each plenum being in fluid connection with an area external to the protrusion through a respective pressure line. The pressure lines provide a direct fluid path to their respective receptacles.

In certain embodiments, the receptacles each have a cross-sectional shape and the base has a cross-sectional perimeter in a plane perpendicular to the longitudinal axis. The combined cross-sectional shapes of the receptacles are too large to fit within the cross-sectional perimeter of the base. The pressure lines can also each have a cross-sectional shape. The combined cross-sectional shapes of one pressure line and of one receptacle are too large to fit within the cross-sectional perimeter of the base.

In accordance with certain embodiments, the receptacles can have circular cross-sections and each can have a receptacle diameter in a plane aligned with the longitudinal axis. The base and pressure lines can also have circular cross-sections. The base can have a base diameter in a plane perpendicular to the longitudinal axis where the combined receptacle diameters are greater than the base diameter.

It is contemplated that the receptacles can be configured to each receive a separate high temperature pressure capsule. In addition, the protrusion can also include an end surface configured to secure circuitry. The transducer baseplate can also include a mounting flange below the base with respect to the longitudinal axis. The pressure lines can define a channel through the mounting flange, through the base, and through the protrusion to provide a direct fluid path to their respective receptacles. The mounting flange can have sealing sockets defined proximate to respective first ends of the pressure lines. The sealing sockets can be configured to receive seals. Further, the transducer baseplate is configured to withstand temperatures from −55 to 205 degrees Celsius (218.15 to 478.15 degrees Kelvin), and pressures from 2 to 800 psi (13.9 kPa to 5.52 MPa) while still maintaining less than ±1% error.

A duplex pressure transducer includes a transducer baseplate as described above, a separate high temperature pressure capsule secured in each receptacle, circuitry, and a transducer housing. The circuitry is operatively connected to an end surface of the protrusion each in electronic communication with a separate high temperature pressure capsules. The transducer housing is sealed over at least the transducer receptacles, high temperature pressure capsules, and circuitry. The circuitry can include a pair of opposing circuit boards. The circuit boards each can be configured to receive pressure readings from their respective separate high temperature pressure capsules.

In accordance with certain embodiments, the high temperature pressure capsules can be spaced away from the transducer housing such that there is clearance for at least one electrical cable each between the high temperature pressure capsules and the transducer housing. The transducer housing can be affixed to the baseplate by weld joints located on the base, and can include a port configured to receive electrical connectors. The transducer housing and weld joints can be configured to withstand burst pressures of up to 2540 psi (17.51 MPa).

It is contemplated that the transducer baseplate, high temperature pressure capsules, circuitry and transducer housing can be configured to withstand temperatures from −55 to 205 degrees Celsius (218.15 to 478.15 degrees Kelvin) and pressures from 2 to 800 psi (13.9 kPa to 5.52 MPa) while still maintaining less than ±1% error.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a perspective view of an exemplary embodiment of a duplex pressure transducer constructed in accordance with the present disclosure, showing a transducer housing partially sealed over the transducer baseplate of FIG. 1; and FIG. 4 is a cross-sectional perspective view of the duplex pressure transducer of FIG. 3, showing the transducer baseplate of FIG. 1 with high temperature pressure capsules and circuit boards.

DETAILED DESCRIPTION OF THE PREFERRED EMBODIMENTS

Figure 1:
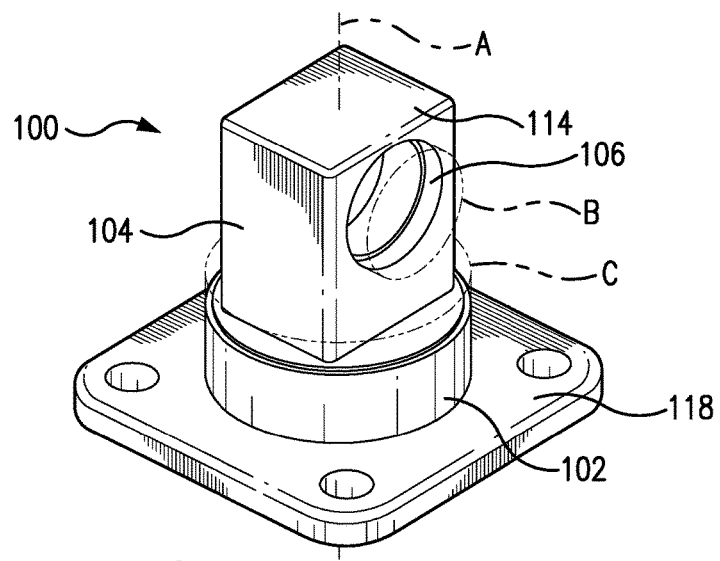
FIG. 1 is a perspective view of an exemplary embodiment of a transducer baseplate constructed in accordance with the present disclosure, showing a mounting flange, a base, a protrusion and receptacles.

Reference will now be made to the drawings wherein like reference numerals identify similar structural features or aspects of the subject disclosure. For purposes of explanation and illustration, and not limitation, a perspective view of an exemplary embodiment of a transducer baseplate constructed in accordance with the present disclosure is shown in FIG. 1 and is designated generally by reference character 100. Other embodiments of a transducer baseplate constructed in accordance with the present disclosure, or aspects thereof, are provided in FIGS. 2-4, as will be described.

Figure 2:
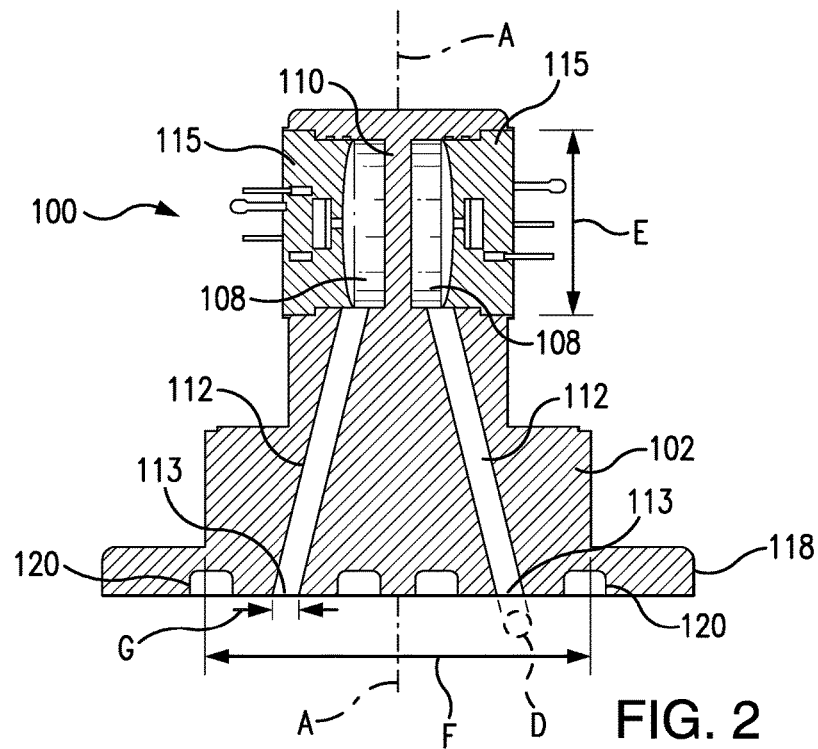
FIG. 2 is a cross-sectional side-elevation view of the transducer baseplate of FIG. 1, showing the receptacles with high temperature pressure capsules, respective pressure plena, pressure lines and sealing sockets.

In reference to FIGS. 1 and 2, a transducer baseplate 100 includes a base 102, a protrusion 104 extending from base 102 along a longitudinal axis A, a pair of opposed transducer receptacles 106 defined within protrusion 104, and pressure plena 108 associated with each receptacle 106. Protrusion 104 has an end surface 114. Transducer baseplate 100 also includes a mounting flange 118. Mounting flange 118 is below base 102 with respect to longitudinal axis A, as oriented in FIG. 1. Mounting flange 118 has sealing sockets 120 defined proximate to respective first ends 113 of pressure lines 112. Sealing sockets 120 are configured to receive seals (not shown). Those skilled in the art will readily appreciate that a variety of seals can be used, such as, o-ring seals.

Pressure plena 108 are separated by a plenum wall 110, each plenum 108 being in fluid connection with an area external to protrusion 104 through a respective pressure line 112. Pressure lines 112 provide a direct fluid path to their respective receptacles 106. Transducer baseplate 100 is configured to withstand temperatures from −55 to 205 degrees Celsius (218.15 to 478.15 degrees Kelvin), and pressures from 2 to 800 psi (13.9 kPa to 5.52 MPa) while still maintaining less than ±1% error. Those skilled in the art will readily appreciate that the temperature and pressure ranges listed above are working temperatures and pressures for maintaining less than ±1% error and that baseplate 100 can be configured to withstand higher temperatures and pressures.

Now with reference to FIG. 2, each receptacle 106 is configured to receive a separate high temperature pressure capsule 115. Pressure lines 112 each define a channel through mounting flange 118, through base 102, and through protrusion 104 to provide a direct fluid path to their respective receptacles 106. Receptacles 106 each have a cross-sectional shape B, and base 102 has a cross-sectional perimeter C, in a plane perpendicular to the longitudinal axis A. Combined cross-sectional shapes B are too large to fit non-overlappingly within cross-sectional perimeter C of base 102. In another aspect, each receptacle 106 has a receptacle diameter E in a plane parallel to longitudinal axis A. Base 102 has a base diameter F in a plane perpendicular to the longitudinal axis A. The combined receptacle diameters E are greater than base diameter F.

Those skilled in the art will readily appreciate that, high temperature pressure capsules 115 do not fit inside the transducer housing in a side by side arrangement, i.e. where each receptacle diameter E is aligned perpendicular to longitudinal axis A. Instead, a vertical configuration of high temperature pressure capsules 115, i.e. with each receptacle diameter E aligned parallel to longitudinal axis A, is used to create a transducer that accommodates larger capsules than traditional configurations, therein making the transducer more accurate. Further, those skilled in the art will readily appreciate that while shown substantially in cylindrical shapes, high temperature pressure capsules 115 and receptacles 106, can be of any suitable shape.

Now with reference to FIGS. 3 and 4, another exemplary embodiment is shown, namely a duplex pressure transducer 200. Duplex pressure transducer 200 includes a transducer baseplate 100 as described above, a separate high temperature pressure capsule 115 secured in each receptacle 106, circuitry 116, and a transducer housing 122. Circuitry 116, shown as a pair of opposing circuit boards, are operatively connected to end surface 114 of protrusion 104 each in electronic communication with separate high temperature pressure capsules 115. Each circuit board 116 is configured to receive pressure readings from their respective separate high temperature pressure capsules 115. Those skilled in the art will readily appreciate that high temperature pressure capsules 115 are spaced away from transducer housing 122 such that there is clearance for at least one electrical cable each, shown schematically, between high temperature pressure capsules 115 and transducer housing 122.

Now with reference to FIG. 4, transducer housing 122 is hermetically sealed over at least transducer receptacles 106, high temperature pressure capsules 115, and circuit boards 116. Transducer housing 122 is affixed to the baseplate 100 by weld joints 124 located on base 102. Further, transducer housing 122 includes a port 126 configured to receive electrical connectors 128, shown schematically. Those skilled in the art will readily appreciate that while one port 126 is shown, any suitable number of ports can be defined in the transducer housing 122 for a given application. The thickness and material of transducer housing 122 and weld joints 124 is configured to withstand burst pressures of up to 2540 psi (17.51 MPa).

Those having skill in the art will readily appreciate that duplex pressure transducer 200 uses separate high temperature pressure capsules 115 to measure differential pressure across a medium, such as an oil filter. Duplex pressure transducer 200 is designed to have less than ±1% error over the operating ranges of −55 to 205 degrees Celsius (218.15 to 478.15 degrees Kelvin) and 2 to 800 psi (13.9 kPa to 5.52 MPa). To achieve such accuracy under these high pressure and temperature conditions, one having skill in the art will readily appreciate that the size of the high temperature pressure capsules 115 may need to increase. As such, duplex pressure transducer 200 is configured to allow for a larger capsule, without sacrificing size or pressure and temperature capacity. The vertical transducer baseplate 100 configuration for the high temperature pressure capsules 115, as described above, allows for increased accuracy by tolerating a larger capsule, without sacrificing duplex pressure transducer size, or pressure and temperature capacity.

The methods and systems of the present disclosure, as described above and shown in the drawings, provide for a duplex transducer baseplate and duplex pressure transducer with superior properties including increased accuracy, small size and high pressure and temperature tolerance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A transducer baseplate comprising:
   a base with a protrusion extending from the base along a longitudinal axis;
   a pair of transducer receptacles defined within the protrusion, wherein the transducer receptacles are opposed from one another across the longitudinal axis, wherein the transducer receptacles are in fluid and operational isolation from one another; and
   a pair of pressure plena separated by a plenum wall, one plenum in fluid communication with each receptacle, respectively, wherein the pressure plena are in fluid and operational isolation from one another within the protrusion, wherein each plenum is in fluid connection with an area external to the protrusion through a respective pressure line, and wherein the pressure lines are at an oblique angle with respect to one another and provide a direct fluid path to their respective receptacles.

2. A transducer baseplate as recited in claim 1, wherein the receptacles each have a width parallel to the longitudinal axis, and wherein the combined widths of the receptacles, when oriented in a common plane perpendicular to the longitudinal axis, are too large to fit within the cross-sectional perimeter of the base.

3. A transducer baseplate as recited in claim 1, wherein the receptacles each have a receptacle diameter in a plane aligned with the longitudinal axis.

4. A transducer baseplate as recited in claim 3, wherein the base has a base diameter in a plane perpendicular to the longitudinal axis, and wherein the combined receptacle diameters are greater than the base diameter.

5. A transducer baseplate as recited in claim 1, wherein the transducer receptacles are each configured to each receive a separate high temperature pressure capsule.

6. A transducer baseplate as recited in claim 1, further comprising a mounting flange below the base with respect to the longitudinal axis, wherein the pressure lines define a channel through the mounting flange, through the base, and through the protrusion to provide a direct fluid path to their respective receptacles.

7. A transducer baseplate as recited in claim 6, wherein the mounting flange includes sealing sockets defined proximate to respective first ends of the pressure lines, wherein the sealing sockets can be configured to receive seals.

8. A transducer baseplate as recited in claim 1, wherein the pressure lines converge toward one another in a direction toward their respective plena.

9. A duplex pressure transducer comprising:
   a transducer baseplate including:
      a base with a protrusion extending from the base along a longitudinal axis;
      a pair of transducer receptacles defined within the protrusion, wherein the transducer receptacles are opposed from one another across the longitudinal axis, wherein the transducer receptacles are in fluid and operational isolation from one another; and
      a pair of pressure plena separated by a plenum wall, wherein one plenum is in fluid communication with each receptacle, respectively, and each plenum is in fluid connection with an area external to the protrusion through a respective pressure line, wherein the pressure lines are at an oblique angle with respect to one another and provide a direct fluid path to their respective receptacles;
   a separate high temperature absolute pressure capsule secured in each receptacle, wherein the high temperature absolute pressure capsules are fluidly isolated from one another;
   circuitry operatively connected to an end surface of the protrusion each in electronic communication with a separate high temperature pressure capsule; and
   a transducer housing sealed over at least the transducer receptacles, high temperature pressure capsules, and circuitry.

10. A duplex pressure transducer as recited in claim 9, wherein the receptacles each have a width parallel to the longitudinal axis, and wherein the combined widths of the receptacles, when oriented in a common plane perpendicular to the longitudinal axis, are too large to fit within the cross-sectional perimeter of the base.

11. A duplex pressure transducer as recited in claim 9, wherein the receptacles each have a receptacle diameter in a plane aligned with the longitudinal axis.

12. A duplex pressure transducer as recited in claim 11, wherein the base has a base diameter in a plane perpendicular to the longitudinal axis, and wherein the combined receptacle diameters are greater than the base diameter.

13. A duplex pressure transducer as recited in claim 9, wherein the transducer housing is affixed to the transducer baseplate by weld joints located on the base.

14. A duplex pressure transducer as recited in claim 9, wherein the transducer housing comprises a port configured to receive electrical connectors.

15. A duplex pressure transducer as recited in claim 9, wherein the circuitry includes a pair of opposing circuit boards, wherein the circuit boards are each configured to receive pressure readings from their respective separate high temperature pressure capsules.

16. A duplex pressure transducer as recited in claim 9, wherein the high temperature pressure capsules are spaced away from the transducer housing such that there is clearance for at least one electrical cable each between the high temperature pressure capsules and the transducer housing.

17. A duplex pressure transducer as recited in claim 9, wherein the pressure lines converge toward one another in a direction toward their respective plena.

18. A transducer baseplate comprising:
   a base with a protrusion extending from the base along a longitudinal axis;
   a pair of transducer receptacles defined within the protrusion, wherein the transducer receptacles are opposed from one another across the longitudinal axis, wherein the transducer receptacles are in fluid and operational isolation from one another; and
   a pair of pressure plena separated by a plenum wall, one plenum in fluid communication with each receptacle, respectively, wherein the pressure plena are in fluid and operational isolation from one another within the protrusion, wherein each plenum is in fluid connection with an area external to the protrusion through a respective pressure line, and wherein the pressure lines provide a direct fluid path to their respective receptacles.

* * * * *